United States Patent [19]

Weltmer et al.

[11] Patent Number: 4,579,723

[45] Date of Patent: Apr. 1, 1986

[54] METHODS FOR PURIFYING INERT GAS STREAMS

[75] Inventors: William R. Weltmer, Murray Hill; Walter H. Whitlock, Peapack, both of N.J.

[73] Assignee: The BOC Group, Inc., Murray Hill, N.J.

[21] Appl. No.: 717,055

[22] Filed: Mar. 28, 1985

[51] Int. Cl.$^4$ .................. C01B 13/00; C01B 1/26; C01B 31/18; C01B 31/20
[52] U.S. Cl. .................. 423/219; 423/230; 423/247; 423/248
[58] Field of Search ............ 423/219, 230, 247, 248; 55/66

[56] References Cited

U.S. PATENT DOCUMENTS

| | | | |
|---|---|---|---|
| 3,061,403 | 10/1962 | Rendos | 423/219 X |
| 3,535,074 | 10/1970 | Nakashima | 423/219 X |
| 3,885,927 | 5/1975 | Sherman et al. | 55/68 |
| 4,353,716 | 10/1982 | Rohde | 502/34 X |
| 4,459,270 | 7/1984 | Leppard et al. | 423/219 X |

FOREIGN PATENT DOCUMENTS

| | | | |
|---|---|---|---|
| 166023 | 5/1953 | Australia | 423/219 |
| 1090646 | 10/1960 | Fed. Rep. of Germany | 55/66 |
| 55-31415 | 3/1980 | Japan | 423/219 |

Primary Examiner—W. J. Shine
Attorney, Agent, or Firm—David L. Rae; Larry R. Cassett

[57] ABSTRACT

An inert gas stream containing parts per million levels of impurities such as $O_2$, CO, $CO_2$, $H_2$, $H_2O$, is purified by passing the same sequentially through a first bed and second bed of material. In the first bed, carbon monoxide and hydrogen are both reacted with oxygen to form $CO_2$ and $H_2O$. The latter is retained in this first bed while the reaction products and the inert gas stream are supplied to a second of material which is comprised of a getter. In this bed, oxygen reacts with the getter material and carbon dioxide is adsorbed therein so that the inert gas stream leaving the second bed is substantially free of such impurities. The first and second beds of material operate at temperatures up to about 38° and these materials may be regenerated by heating the same to approximately 200° C. and purging such beds with a purge gas flow.

19 Claims, 1 Drawing Figure

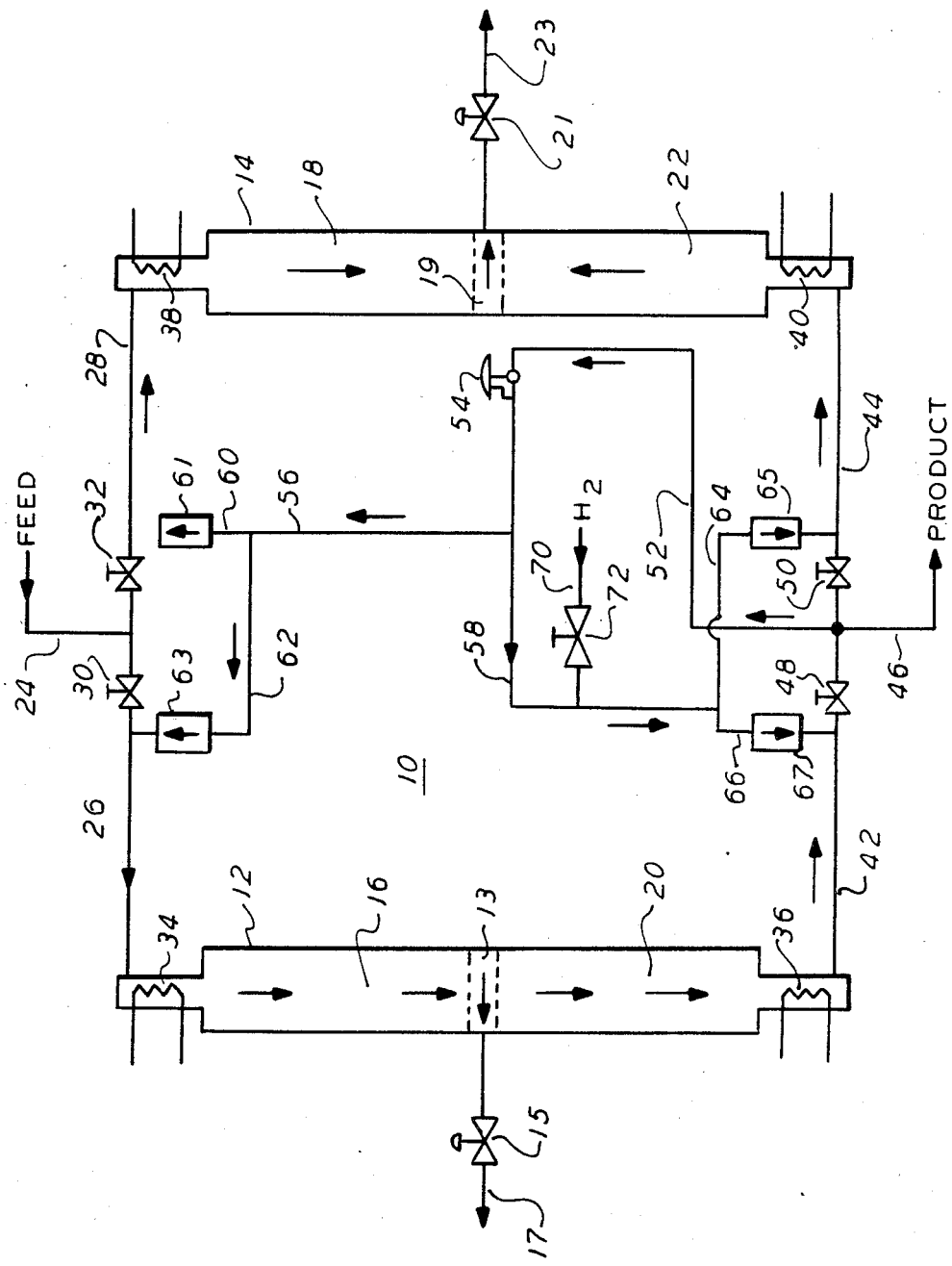

METHODS FOR PURIFYING INERT GAS STREAMS

BACKGROUND OF THE INVENTION

The present invention relates to methods and apparatus for purifying inert gas streams and more particularly for removing parts per million levels of impurities from nitrogen-based streams.

As the semiconductor industry is developing integrated circuits with ever increasing line densities, the manufacturing processes employed require that materials utilized are as free of impurities as is possible. Inert gas such as nitrogen or argon, etc., is frequently utilized in semiconductor manufacturing processes and while commercially available nitrogen and argon are relatively pure, it is necessary to assure that even greater purities are maintained so as to avoid contamination of semicondiuctor materials by impurities such as $H_2$, $H_2O$, CO, $CO_2$, $O_2$, etc.

Although nitrogen will react with certain elements under particular conditions, it will be understood that the term "inert gas" as used herein includes nitrogen. It has previously been proposed to remove certain of the above-mentioned impurities, e.g., $O_2$ by catalytically combining oxygen with hydrogen over a catalyst such as DeOxo D, etc. However, this process requires that relatively high temperatures such as 450° C. be employed to assure that such catalytic combustion occurs to the necessary extent. It is then necessary to cool the hot "purified" inert gas in heat exchangers or other suitable equipment. The latter is relatively expensive and adds a significant step to the overall purification process. A typical catalytic process for reacting hydrogen with oxygen is disclosed in Japanese published patent application No. 59-54608.

In addition, it is known to use zeolites to adsorb oxygen in inert gas streams to thereby purify the latter. This typically involves cooling a zeolite bed to a very low temperature, i.e. below about $-220°$ F. or so and essentially requires that cryogenic conditions be established. This in turn will require that special materials and insulation, etc., be provided. A typical adsorption process of this type is disclosed in U.S. Pat. No. 3,928,004. It is also known to utilize zeolites to remove $CO_2$ from air or inert gas streams at ambient temperatures and such a process is illustrated in U.S. Pat. No. 3,885,927. Although it would appear from this reference that carbon dioxide can be removed from air or inert gas streams, it does not appear that such adsorbents as disclosed therein are effective to remove other impurities such as $O_2$, $H_2$, CO, etc., and no such capability is suggested by this patent.

Other techniques for removing oxygen from gas streams include the use of copper-based getter materials as is described in Japanese published patent application No. 53-33312. In this process, the getter material is heated to a temperature of at least 150° C. Subsequently, the gas stream is cooled and this process only effective to remove oxygen and not other impurities such as $H_2O$ and $CO_2$, etc.

Consequently, none of the processes developed to date appear to be capable of removing a wide range of impurities from inert gas streams in a relatively simple and inexpensive manner at approximately ambient temperature to which end the present invention is directed. Furthermore, there are no known prior art processes which are effective to remove parts-per-million levels of CO from inert gas streams under ambient temperature conditions.

OBJECTS OF THE INVENTION

It is an object of the present invention to provide methods and apparatus for purifying inert gas streams.

It is another object of the invention to provide improved processes for removing a plurality of impurities present in parts per million levels from inert gas streams.

It is yet another object of the invention to provide simple yet inexpensive processes for removing impurities from inert gas streams at substantially ambient temperatures.

It is a further object of the present invention to provide processes for removing impurities from inert gas streams in which beds of adsorbent material may be readily regenerated following an adsorption/reaction with impurities in such inert gas streams.

It is still a further object of the present invention to purify an inert gas stream by a process in which the electrical power consumption per unit volume of inert gas purified is relatively low.

Other objects of the present invention will become apparent from the following description of exemplary embodiments thereof which follows and the novel features will be particularly pointed out in conjunction with claims appended hereto.

SUMMARY

In accordance with the invention, parts per million level of impurities in inert gas streams are effectively removed by passing the stream through beds of reactive/adsorbent material at substantially ambient temperatures i.e., up to about 38° C. The inert gas stream is typically comprised of parts per million levels of CO, $CO_2$, $H_2$, $H_2O$ and $O_2$, balance nitrogen or argon. Initially, the inert gas stream is supplied to a first bed of material, typically a catalytic material such as DeOxo A which is commercially available from Engelhard Industries, Menlo Park, N.J. DeOxo A comprises a mixture of chromium and platinum, typically in the range of 0.5 weight percent, on gamma-alumina. In this bed, CO reacts with oxygen in the inert gas stream to form $CO_2$ and hydrogen reacts with oxygen to form $H_2O$ with both reactions occurring at substantially ambient temperatures. The remaining gas stream is supplied to a second bed of a getter material although $H_2O$ will tend to be trapped in the first bed of material. The getter material of the second bed may be comprised, for example, of Dow Q1 which is commercially available from Dow Chemical Company. The material Dow Q1 comprises a mixture of copper, nickel and cobalt with traces of silver, chromium and manganese mounted on granular gamma alumina. This material is effective to react with oxygen in the inert gas stream supplied thereto and to trap $CO_2$. Consequently, the inert gas stream leaving the second bed is substantially free of the impurities contained in the stream supplied to the first bed and preferably, the total impurities are less than 1.0 parts per million in the stream exiting the second bed.

In order to assure continued effectiveness of the aforementioned first and second beds of material, the same are regenerated by initially heating the beds to a temperature of about 200° C. while a purge flow of inert gas such as $N_2$ is supplied through the beds of material to remove trapped impurities such as $CO_2$, $H_2O$, etc.

Preferably, the flow of purge gas to the first bed is passed in the same direction as the inert gas stream while the flow of purge gas to the second bed is in an opposite direction to the flow of the inert gas stream therethrough. The first and second beds may be disposed in a vertical relation to one another although the beds may be positioned in other relationships as well. The beds may be disposed in a single container or other suitable structure. A space between the first and second beds is provided to enable impurities eluted by the purge gas flows to be removed from the bed so that the impurities removed from the first bed do not flow into the second bed and vise versa. The purge gas flows containing impurities are preferably combined and removed from the dual bed system and the purge gas flow may be vented to atmosphere or otherwise utilized if the impurities can be tolerated. The purge gas flows are typically at a flow rate of about one-fifth of the flow rate of the inert gas stream supplied to the first and second beds of material and preferably, the purge gas flow is less than one-half of the inert gas stream flow rate. A small flow of $H_2$ is added to the purge gas flowing through the second bed to reduce the oxides formed on the getter material. As this results in the formation of $H_2O$, the $H_2$ flow is terminated after a predetermined time and the purge gas flow to the second bed will sweep such $H_2O$ therefrom. Furthermore, regenerating the first and second beds does not require excessive temperatures as a temperature of about 200° C. has been found to be adequate nor are relatively high flow rates of purge gas required for this purpose.

Consequently, the process according to the invention is effective to remove parts per million levels of impurities such as CO, $O_2$, $H_2$, $H_2O$, $CO_2$, etc. from an inert gas stream, e.g., nitrogen, at substantially ambient temperatures. Thus, the process is relatively cost efficient to practice and does not require additional equipment in the form of heat exchangers in addition to the beds of material described above. Cooling water normally utilized with such heat exchangers is not required and the process according to the invention can be performed with a lower consumption of power per unit of inert gas purified. Accordingly, the simplicity of the process according to the invention leads to more reliable purification of inert gas streams and requires less expensive equipment therefor.

BRIEF DESCRIPTION OF THE DRAWING

The invention will be more clearly understood by reference to the following description of exemplary embodiments thereof in conjunction with the following drawing in which the sole FIGURE is a diagramatic view of apparatus for performing the process according to the invention.

Description of Preferred Embodiment

In accordance with the invention, an inert gas stream, typically nitrogen or argon, which contains parts per million levels of impurities is further purified. A typical inert gas stream is available from conventional cryogenic air separation units wherein purities of at least 99.999 percent nitrogen or argon, etc., are readily obtainable. Usually, the impurities in such inert gas streams include oxygen, hydrogen, and CO, which for many applications or uses of such inert gas streams will not present significant problems. However, as mentioned previously, in order to fabricate semiconductor materials, inert gas streams must be purified to higher levels than are conventionally available from air separation units. While a typical "merchant" inert gas stream, formed by vaporizing liquid nitrogen or liquid argon, frequently contains the aforementioned impurities but also may contain parts-per-million levels of $CO_2$ and $H_2O$. The latter impurities are typically picked up by the inert gas stream during the handling and delivery thereof from an on-site air separation plant and an end use location. Generally the total level of all of the foregoing impurities is up to about 10 parts per million. Thus, the reduction of such impurities to a total of about 1 part per million is an objective of the present invention and is achieved by the process described hereinbelow in greater detail.

Inert gas streams are purified in accordance with the invention by supplying the same sequentially through first and second beds of material, the first bed comprising a catalyst while the second bed is essentially comprised of a getter material. These beds may be disposed in a single vessel or chamber although it is within the scope of the present invention to utilize a pair of discrete vessels, each containing the catalyst or the getter material. Preferably, the catalyst or reactive material utilized as the first bed is DeOxo A. Although this catalyst material has been utilized for removal of oxygen from inert gas streams, typically by the reaction with ammonia, prior use of this material is believed to have occurred only at elevated temperatures of about 200° C. or greater wherein catalytic combustion is effected. Oxygen is generally present in sufficient quantities at the inlet of the catalyst bed to react with $H_2$ and to oxidize carbon monoxide to form $CO_2$ under substantially ambient temperatures, i.e., up to about 38° C. In addition, it has been found that DeOxo A is effective to convert hydrogen and CO to $H_2O$ and $CO_2$, respectively, when only parts-per-million levels, i.e. up to about 10 ppm of oxygen are present in an inert gas stream. It is important that the catalyst is one which is not poisoned by CO as is the case with many materials and is effective to assure that the aforementioned oxidation reactions occur at approximately ambient temperatures. In addition, the catalyst should enable such reactions to occur for a relatively long period of time, e.g., several days. It has been found that $H_2O$ produced by the aforementioned reaction of oxygen and hydrogen in the presence of DeOxo A is virtually completely retained therein.

Preferably, the inert gas stream supplied to the catalyst material is caused to flow therethrough and then through a second bed of material which, as described above, is a getter material such as Dow Q1. This material is effective for reacting with any unreacted oxygen in the inert gas stream supplied thereto and adsorbing carbon dioxide in the inert gas stream. Typically, oxygen will react with copper in this getter material to form an oxide and essentially preclude oxygen from passing therethrough together with the inert gas stream. Again, it has been found that the reaction of oxygen and copper will occur at substantially ambient temperatures which avoids the necessity to extensively heat the getter material. Consequently, the effluent from the second bed of material is an inert gas stream wherein the total impurities of the stream supplied to the inlet of the first bed of material are substantially reduced and preferably are reduced to a total not exceeding 1 part per million of such impurities. Furthermore, the process according to the invention effectively purifies an inert gas stream containing parts-per-million levels of one or more of impurities such as CO, $O_2$, $CO_2$, $H_2O$ and $H_2$ under substantially ambient temperatures which in turn leads to a relatively simple yet reliable and power efficient purification process.

Upon continued flow of an inert gas stream containing the impurities through the catalyst/reactive material and the getter material, the catalyst will eventually become loaded with $H_2O$ while the getter will become loaded with $CO_2$ and $O_2$. At a certain point in time, impurities in the feed inert gas stream will break through and will appear in the product gas stream exiting the bed of getter material. Prior to this time, it is necessary to regenerate the catalyst and getter material and, preferably, regeneration is accomplished in the manner now to be described. Initially, the supply of a feed inert gas stream to the inlet of the catalyst bed is terminated and a flow of purge inert gas, e.g. nitrogen, is supplied through the catalyst in the direction of the flow of the feed inert gas stream. In addition, nitrogen is passed through the bed of getter material in a direction opposite to the flow of the inert gas stream. Each purge inert gas flow rate is typically about 1/10 of the flow rate of the feed inert gas stream and preferably, the total purge gas flow rate is less than one-half of the flow rate of the feed inert gas stream. Thus, a relatively small purge inert gas flow is required to regenerate the catalyst and the bed of getter material. In addition, both of these beds are heated to a temperature of approximately 200° C. during regeneration to enhance the ability of the purge gas flow to elute moisture and $CO_2$ therefrom. When the first and second beds of material are disposed vertically in a single vessel, the downward flow of purge inert gas supplied to the catalyst material is removed from a space between the beds of catalyst and getter materials by combining this purge inert gas flow with the purge gas passing upwardly through the bed of getter material and removing the latter flow prior to its passage upwardly through the bed of the catalyst material. In this manner, the purge inert gas flow supplied to one bed of material is precluded from carrying impurities eluted therefrom into the other bed of material. The resulting purge inert gas flow may then be vented to atmosphere or utilized for other purposes if such impurities can be tolerated.

With the beds of material being at a temperature of about 200° C. or so, a relatively small flow of hydrogen is passed through the getter material to reduce copper oxides to copper thereby enabling the getter material to subsequently react with oxygen in the inert gas stream supplied thereto. Any hydrogen which passes through the getter material unreacted, is removed from the space between beds and does not contact the catalyst thereby avoiding damage to this material. As this reduction of the getter material tends to form $H_2O$ a flow of purge gas, free of hydrogen, is passed through the bed of getter material for a time period necessary to assure that $H_2O$ is removed therefrom. Typically, this latter flow of purge gas may continue for several hours. At this point, the beds of catalyst material and the getter material are permitted to cool to approximately ambient temperature at which point the beds may be utilized to again purify an inert gas feed stream as mentioned above. As the total period of time required for regeneration is approximately 10-20% of the "run" time of the apparatus according to the invention, and purge gas flows are considerably less than the feed inert gas flow rate, the cost of regeneration is relatively low.

Referring now to the drawing, illustrated therein is an exemplary embodiment of apparatus 10 for practicing the method according to the invention. More particularly, a pair of vessels 12 and 14 are provided with each vessel being capable of containing a catalyst material 16, 18 and a getter material 20, 22, respectively. In addition, spaces 13 and 19 exist between beds of material in each of vessels 12 and 14. Vessel 12 is provided with an outlet conduit 17 which is selectively in communication with space 13 by means of valve 15 while a conduit 23 is similarly disposed with respect to space 19 of vessel 14 by means of valve 21.

A feed inert gas conduit 24 is connected to conduits 26 and 28 having valves 30 and 32 therein. Conduit 26 communicates with the upper portion of vessel 12 and the feed inert gas stream is caused to flow downwardly therethrough, exits vessel 12 through conduit 42. Similarly, and as will be described subsequently, the feed inert gas flow is alternately supplied through conduit 28 to the upper portion of vessel 14 and leaves this vessel through conduit 44. The abovementioned outlet conduits 42 and 44 are selectively placed in communication with conduit 46 by means of valves 48 and 50, respectively. A purified product gas stream is supplied through conduit 46 for use, for example, in a semiconductor fabrication process, etc. Conduit 52 is connected to conduits 42 and 44 and is effective to supply a flow of the inert gas stream through regulator 54 and to conduits 56 and 58. The former conduit 56 is connected to further conduits 60 and 62 in which check valves 61 and 63, are located, respectively. Conduits 60 joins conduit 28 and conduit 62 joins conduit 26. A supply of hydrogen gas is selectively passed through conduit 70 and valve 72 into conduit 58 which in turn is coupled to lines 64 and 66 in which check valves 65 and 67 are disposed, respectively.

Preferably, catalyst material 16 and 18 is comprised of DeOxo A while the getter material is comprised of Dow Q1. Alternately, a material such as alumina could be added to vessels 12 and 14 at the inlet of the catalyst material 16 and 18, respectively in the event relatively moist feed inert gas is to be purified. For example, if this inert gas stream contained about 10 ppm $H_2O$, it would be beneficial to employ alumina as mentioned above. Also, alumina can be added to getter material 20 and 22 in the event it is desirable to balance carbon dioxide and oxygen breakthrough. Alumina is considered preferable to zeolite 5A and 13X and by employing alumina for this purpose, premature breakthrough of one component is less likely to occur which in turn will enable the "run" time of each vessel 12 or 14 to be extended as far as possible. Heating elements 34, 36, 38 and 40, which may take the form of any conventional heating devices, are disposed in vessels 12 and 14 as illustrated in the drawings for purposes which will become apparent from the following description of operation of the depicted apparatus.

In describing the operation of the apparatus illustrated in the drawing, it will be assumed that one vessel 12 has been regenerated and is set to commence purification of a feed inert gas stream while a second vessel 14 has just completed a purification run and is to be regenerated. Initially, valves 30 and 48 are open while valves 32 and 50 are closed so that the feed inert gas stream supplied through conduit 24 passes through conduit 26 into the catalyst bed 16 in vessel 12. Valve 15 is closed and the inert gas stream then passes downwardly through catalyst material 16 and getter 20 while heater 34 is energized if necessary to increase the temperature in vessel 12 to a desired degree. As mentioned previously, it may be necessary to increase such temperature to a level of up to about 38° C. but in the event that lower, essentially ambient temperatures are satisfactory, it will not be necessary to energize heating means 34 at this time. The purified inert gas flow is supplied from vessel 12 through conduit 42 and valve 48 to conduits 46 and 52. A major portion of the flow of purified inert gas, i.e. about 90% or so, passes through conduit 46 while a minor portion is supplied through conduit 52 and pressure regulator 54. This latter device is set to an appropriate, relatively low pressure such as about 15 psig. The purified inert gas passing through regulator 54 is supplied through conduits 56 and 58. The inert gas flow in conduit 56, which is a purge inert gas stream, is supplied through conduits 60 and 62 through check valves 61 and 63, respectively. As the pressure of the feed inert gas stream in conduit 26 is typically greater than 15 psig, the purge gas stream in conduit 62 will not flow through check valve 63 but the purge gas stream in conduit 60 will flow through valve 61 into conduit 28. As valve 32 is closed, the flow of purge gas through conduit 28 will enter catalyst material 18 of vessel 14 and will flow downwardly therethrough into space 19. Heating means 38 is preferably energized so as to establish a temperature of approximately 200° C. in catalyst material 18 which enables the moisture retained therein to be swept into space 19 and eluted from vessel 14 through conduit 23 as valve 21 is now in an open condition. Similarly, a purge gas flow of essentially purified inert gas is supplied through conduit 58 as mentioned above which in turn is supplied to conduits 64 and 66. However, as the pressure of purified inert gas in line 42 is greater than that in conduit 66, there will be no flow of purge inert gas through valve 67 although such a flow will pass through valve 65 into conduit 44 and thence into the getter material 22 of vessel 14. Heating means 40 is energized to establish a temperature of about 200° C. in getter material 22 from which retained carbon dioxide is eluted into space 19 and is then removed from vessel 14 through conduit 23. In order to effectively reduce copper oxide formed in the getter material during purification, valve 72 is opened to permit a relatively small flow, approximately 1.5% or so of the purge inert gas flow in conduit 58 to flow through conduit 70 and valve 72 into conduit 58. This flow of hydrogen gas is supplied through conduit 44 into vessel 14 and is effective to reduce the oxides as previously mentioned. As this reduction of oxides involves a reaction between oxygen and hydrogen to form $H_2O$ in getter material 22, the flow of hydrogen is terminated after a predetermined time interval by closing valve 72 while the flow of purge inert gas is continued to elute any such moisture from getter material 22. Subsequently, valve 21 is closed which effectively terminates the flow of inert purge gas through vessel 14 and heating means 38 and 40 are de-energized so that catalyst material 18 and getter material 22 remain in an essentially purified inert gas until the catalyst material 16 and getter material 20 in vessel 12 become loaded with impurities at which time valves 30 and 48 are closed and valves 32 and 50 are opened to enable the aforementioned purification and regeneration processes to be performed in vessels 14 and 12, respectively.

Typically, each of vessels 12 and 14 will be effective to purify a feed inert gas stream for a relatively long period of time, i.e. over 160 hours, before regeneration thereof is necessary. However, it will only require up to about 24 hours to regenerate each of vessels 12 and 14 and, as mentioned above, the purge inert gas flow rate required during regeneration is only a minor fraction of the feed inert gas flow rate, i.e. about 10–20%. Accordingly, although the purified inert gas available in conduit 46 as a product stream is reduced during regeneration of one vessel, this product inert gas flow rate will be increased in the time period following regeneration of one vessel prior to complete loading of the other vessel as it purifies the feed inert gas stream. For example, with a feed inert gas stream of 1200 scfh and a purge flow of 100 scfh through the catalyst plus 100 scfh through the getter material, the product inert gas stream in conduit 46 will be approximately 1000 scfh during the first 24 hours or so of purification by vessel 12 and for the following approximately 140 hours, when the purge gas is not required to regenerate vessel 14, the flow rate of the product inert gas stream in conduit 46 can return to approximately 1200 scfh.

The apparatus according to the invention has been experimentally operated to purify an argon feed stream containing approximately 6 ppm by volume oxygen, 1.4 ppm by volume hydrogen, and approximately 1.1 ppm by volume CO. The flow rate of the argon feed stream was 10 liters per minute at a pressure of 30 psig and a temperature of approximately 70° F. The effluent of apparatus 10 was monitored for approximately ten (10) days and exhibited the following impurity levels:

| | |
|---|---|
| Oxygen | 0.1 ppm |
| Carbon Dioxide | 0.05 ppm |
| Hydrogen | 0.1 ppm |
| Carbon Monoxide | 0.1 ppm |
| Methane | 0.2 ppm |
| Water Vapor | 0.15 ppm |

Carbon dioxide was measurable within about five (5) days and reached a level of 1 ppm in about eight days. Oxygen was detected at a level of 0.1 ppm V in just under six days and reached a level of 1 ppm in a little over seven days. DeOxo A was utilized as the reactive/catalyst material while Dow Q1 was used as the getter material. Although Dow Q1 performance as a getter material declines with concentrations of oxygen over 10 ppm by volume, the use of Dow Q1 in connection with merchant quality inert gas such as argon or nitrogen should not be a significant limitation as these gases generally do not contain more than 5 ppm oxygen by volume.

The foregoing and other various changes in form and details may be made without departing from the spirit and scope of the present invention. Consequently, it is intended that the appended claims be interpreted as including all such changes and modifications.

We claim:

1. A method of purifying an inert gas stream containing up to about 10 parts per million of an impurity selected from the group of CO, $O_2$, $H_2$, $H_2O$ and $CO_2$ and mixtures thereof, comprising the steps of:
   passing said inert gas stream through a first bed of a catalytic material at a temperature of up to about 38° C., said catalytic material capable of effecting the reaction of CO and $O_2$ to form $CO_2$ and $H_2$ and $O_2$ to form $H_2O$;
   passing said inert gas stream from said first bed of catalytic material through a second bed of a getter material at a temperature of up to about 30° C., said getter material capable of reacting with unreacted $O_2$ and adsorbing $CO_2$ therein;

retaining said $H_2O$ in said beds of material; and discharging from said second bed of getter material a thus purified inert gas stream containing less than about 1 part per million of said impurity.

2. The method defined in claim 1 wherein said first bed of catalytic material and said second bed of getter material are each retained in first and second vessels respectively, each vessel having a gas inlet and outlet and additionally comprising the step of placing the outlet of said first vessel and said inlet of said second vessel in fluid communication with one another such that said thus purified inert gas stream flows sequentially through said first and second vessels.

3. The method defined in claim 1 additionally comprising the steps of terminating the flow of said inert gas stream to be purified through said beds; heating said beds to a temperature of up to about 200° C.; and passing an inert purge gas flow through said beds to remove impurities adsorbed therein and thereby regenerate said beds.

4. The method defined in claim 3 wherein the steps of passing an inert purge gas flow comprises passing a first portion of said inert purge gas flow through said first bed in the direction of flow of said inert gas stream to be purified therethrough and a second portion of said inert purge gas flow through said second bed in a direction opposite to the direction of the flow of said inert gas stream therethrough.

5. The method defined in claim 4 additionally comprising the step of precluding said first portion of said inert purge gas flow from entering said second bed and precluding said second portion of said inert purge gas flow from entering said first bed.

6. The method defined in claim 5 wherein said first and second beds of material are spaced apart from one another in a single vessel and additionally comprising the steps of discharging said first and second portions of said inert purge gas flows from the first and second beds, respectively, into said space between said beds; and withdrawing said discharged inert purge gas flows from said space.

7. The method defined in claim 6 additionally comprising the step of venting said withdrawn inert purge gas flow to the ambient atmosphere.

8. The method defined in claim 4 additionally comprising the step of passing a flow of hydrogen gas to second bed to reduce oxides formed therein upon passage of said inert gas stream therethrough.

9. The method defined in claim 8 additionally comprising the steps of terminating said hydrogen flow and continuing said flow of inert purge gas through said second bed to remove any $H_2O$ upon reduction of said oxides.

10. The method defined in claim 1 wherein the inert gas stream to be purified contains essentially nitrogen as said inert gas.

11. The method defined in claim 1 wherein the inert gas stream to be purified contains essentially argon as said inert gas.

12. The method defined in claim 1 wherein said second bed of getter material includes copper.

13. The method defined in claim 1 wherein said second bed of getter material includes nickel.

14. The method defined in claim 1 additionally comprising the steps of providing a further pair of first and second beds of material; heating said further pair of beds and supplying an inert purge gas flow therethrough to remove impurities adsorbed therein and thereby regenerate said further pairs of beds.

15. The method defined in claim 14 wherein the flow rate of said inert purge gas is less than about one-half of the flow rate of said inert gas stream.

16. The method defined in claim 1 wherein said first bed of catalytic material contains an $H_2O$ adsorbing substance and additionally comprising the step of adsorbing $H_2O$ introduced into said first bed of catalytic material with said inert gas stream or formed therein upon said reaction between $H_2$ and $O_2$.

17. The method defined in claim 16 wherein said $H_2O$ adsorbing substance is alumina.

18. The method defined in claim 1 additionally comprising the step of introducing a $CO_2$ adsorbing material into said first bed of material.

19. The method defined in claim 1 additionally comprising the step of introducing a $CO_2$ adsorbing material into said second bed of material.

* * * * *